(12) United States Patent
Hatfield et al.

(10) Patent No.: US 11,269,837 B2
(45) Date of Patent: Mar. 8, 2022

(54) DATA TREE CHECKPOINT AND RESTORATION SYSTEM AND METHOD

(71) Applicant: International Business Machines Corporation, Armonk, NY (US)

(72) Inventors: Brian Hatfield, Tucson, AZ (US); Scott Brewer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/819,764

(22) Filed: Mar. 16, 2020

(65) Prior Publication Data
US 2021/0286794 A1    Sep. 16, 2021

(51) Int. Cl.
| G06F 17/30 | (2006.01) |
|---|---|
| G06F 16/22 | (2019.01) |
| G06F 16/23 | (2019.01) |
| G06F 16/182 | (2019.01) |
| G06F 12/0817 | (2016.01) |
| G06F 11/14 | (2006.01) |
| G06F 16/17 | (2019.01) |

(52) U.S. Cl.
CPC ...... *G06F 16/2246* (2019.01); *G06F 11/1451* (2013.01); *G06F 11/1461* (2013.01); *G06F 12/0822* (2013.01); *G06F 16/1734* (2019.01); *G06F 16/1824* (2019.01); *G06F 16/2308* (2019.01)

(58) Field of Classification Search
CPC .......... G06F 16/13; G06F 16/21; G06F 16/24; G06F 16/156; G06N 3/00; G06N 5/00; G05B 13/00
See application file for complete search history.

(56) References Cited

U.S. PATENT DOCUMENTS

| 4,914,569 | A | * | 4/1990 | Levine | ................ | G06F 16/2343 |
|---|---|---|---|---|---|---|
| 5,123,104 | A | * | 6/1992 | Levine | ................ | G06F 16/2246 |
| 6,868,414 | B2 | | 3/2005 | Khanna et al. | | |
| 8,364,648 | B1 | | 1/2013 | Sim-Tang | | |
| 8,745,005 | B1 | | 6/2014 | DeSouter et al. | | |
| 2005/0171960 | A1 | * | 8/2005 | Lomet | ................ | G06F 16/2246 |
| 2012/0221531 | A1 | * | 8/2012 | Liedes | ................ | G06F 16/2308 |
| | | | | | | 707/687 |

(Continued)

OTHER PUBLICATIONS

Lee, I.-H., et al., "Fast Rebuilding B+-Trees for Index Recovery," IEICE Transactions on Information and Systems, Jul. 2006, pp. 2223-2233, vol. E89-D, No. 7.

*Primary Examiner* — Hung D Le
(74) *Attorney, Agent, or Firm* — Scully, Scott, Murphy & Presser, P.C.

(57) ABSTRACT

Systems and methods for storing nodes, preferably, leaf nodes, of a data tree structure into storage are disclosed, and in one or more aspects restoring the leaf nodes from storage, preferably to memory. Copying the nodes into storage includes in an embodiment share-latching a first node of a data tree to be copied; copying the first node that is share-latched into storage; determining if there is a sibling second node linked to the first node; following a link between the first copied node and the sibling second node, share-latching the sibling second node, unlatching the first copied node, and copying the sibling second node into storage. Restoring includes copying the leaf nodes from storage, updating the leaf nodes, and creating/recreating the data tree.

20 Claims, 7 Drawing Sheets

(56) References Cited

U.S. PATENT DOCUMENTS

2013/0318126 A1* 11/2013 Graefe ................ G06F 16/2246
707/797
2016/0034356 A1* 2/2016 Aron ................... G06F 11/1435
707/649

* cited by examiner

DATA TREE CHECKPOINT AND RESTORATION SYSTEM AND METHOD

BACKGROUND

This disclosure relates generally to improved data management, organization, and storage, particularly in data processing and storage systems where large databases or large amounts of data are processed and stored. Specifically, the present disclosure relates to a system and method for storing, sorting, organizing, managing, and restoring data, preferably large data collections, in computerized environments.

The use of electronic data storage is widespread. The adoption of network storage and the relatively rapid increase in the amount of electronic data being created requires the organization, storage, and management of a large volume of electronic data. Storage facilities available to large computer systems allow users to store, update, and recall data from large collections of data. Users and organizations that deal with significant quantities of digital information often have difficulty managing files and data in an efficient and intuitive manner. An inability to easily store, organize, locate, and mange documents and content, can translate into significant inefficiencies and lost opportunities In order to make good use of computer resources, data should be organized intelligently to make the retrieval process efficient. A number of different types of data structures may be used in a computing system for storing, sorting, organizing, and managing information. These data structures include linked lists, hash tables, and tree structures. Tree structures in particular are often used as a technique for optimizing the number of operations that must be performed to locate a particular item within an ordered file system or database. Generally associated with large collections and organizations of data in a computer system is an index, which like the labels on the drawers and folders of a file cabinet, speeds retrieval by directing a search to the part of the file containing the desired item. If the index file is large, another index may be built on top of it to speed retrieval further, and so on. The resulting hierarchy is referred to as a tree.

A number of different types of tree structures for organizing a file and its index are known in the art, including binary trees, m-way trees, AVL trees, radix trees, B-trees, B+ trees, B* trees, B'-trees, tries, and so forth. In binary trees each node has at most two child nodes. The branch taken at a node during a search in a binary tree depends upon the outcome of a comparison of the query key and the single key stored at the node, where the search can only progress in one of two directions. AVL trees are also commonly referred to as height-balanced binary trees, which means that any subtree within the AVL tree is no more than one level deeper on its left (or right) side than it is on the right (or left) side. Radix trees are trees in which a search progresses based on a composite of the information found in the nodes.

B-trees are height-balanced m-way trees, where an m-way tree is a search tree that has at most number "m" entries in each node of the tree. Each node in a B-tree of order d contains at most 2d keys and 2d+1 pointers. B*-trees, B'-trees, B+-trees, and tries are all variations of B-trees. A B*-tree has been defined as a B-tree that employs a local redistribution scheme to delay splitting until 2 sibling nodes are full, and then dividing the 2 sibling nodes into 3, each ⅔ full. In a B+-tree, all keys reside in the leaves. A key is a unique identifier to each data record, and data is generally accessed by searching for the key. The B+-tree upper levels, which are organized as a B-tree, consist only of an index, which is basically a roadmap to enable rapid location of the index and the key. The lowest level of the B+-tree includes leaf nodes that contain the records while the levels above the leaf nodes are the index portion of the tree that has index nodes and pointers. The leaf nodes are usually linked together left to right, and the linked list of leaf nodes (also known as the linked list of leaves) is referred to as the sequence set. The sequence set links allow easy sequential processing (retrieving) of data.

The ability to recover data in the case of error recovery and system restart, as well as for the functions of data snapshot, is another aspect of data record keeping. It is useful to store a tree and restore it for functions such as data snapshot, error recovery, and system restart. Following a crash, the data must be recovered and brought online. Since generally no transactions can be processed during recovery, shorter restoration processes, or processes that permit use of the data as it is being recovered would provide advantages. Especially in an environment under which a huge number of operations are processed, the time to restore data should be minimized.

SUMMARY

The summary of the disclosure is given to aid understanding of a data storage system, an architectural structure of a data storage system, processor, and method of storing, organizing, managing, and/or restoring data residing on a data storage system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to an embodiment of the present disclosure, systems and methods for storing, managing, organizing, and/or restoring data are disclosed. In particular, according to examples, a system and method to store nodes, preferably, leaf nodes, of a data tree structure preferably in persistent storage are disclosed, and in one or more aspects restoring, reconstructing, and copying the leaf nodes from storage, preferably to memory. In an embodiment, a method and/or system of managing data in a data storage system includes: share-latching a first node of a data tree to be copied preferably into persistent storage; copying the first node that is share-latched into persistent storage; determining if there is a sibling second node linked to the first node; and in response to the presence of a sibling second node linked to the first node, following a link between the first node that was copied and the sibling second node, share-latching the sibling second node, unlatching the first node that was copied, and copying the sibling second node preferably into persistent storage. In a further aspect, the method further includes, if there is a sibling third node linked to the right of the sibling second node, and in response to a sibling third node linked to the sibling second node, following a link between the sibling second node and the sibling third node, share-latching the sibling third node, unlatching the sibling second node, and copying the sibling third node preferably into persistent storage. In response to there being no sibling node linked to a node that was copied, in an embodiment the node that was copied is unlatched, and in an aspect, further determining whether the method should copy non-leaf nodes, including a level of internal nodes preferably into persistent storage.

The method in one or more embodiments includes restoring a data tree structure by copying the nodes in storage, preferably persistent storage, into memory. In an aspect, each node that is copied into persistent storage contains two or more records, and in a further embodiment, only leaf nodes containing records are copied preferably into persistent storage, and restored in memory. In an embodiment, restoring the data tree structure includes identifying the most recent complete node checkpoint file. Other aspects of restoring the data tree structure includes reading the nodes in the most recent complete node checkpoint file from storage and copying the nodes read from the most recent complete node checkpoint file into memory, copying the nodes from the most recent complete node checkpoint file in storage concurrently into memory, and/or updating the checkpoint nodes based upon data written since the most recent complete node checkpoint finished. In an aspect, restoring the data tree structure includes setting pointers for the leaf nodes (and/or non-leaf nodes) copied from storage into memory, and/or for the updated leaf nodes.

A computer program product in one or more embodiments is disclosed. The computer program product in an aspect is embodied on one or more computer-readable media and has programming instructions that when executed cause a processor to: share-latch a first node of a data tree to be copied preferably into persistent storage; copy the first node that is share-latched preferably into storage; determine if there is a sibling second node linked to the right of the first node; and in response to a sibling second node linked to the right of the first node, follow a link between the first node that was copied and the sibling second node, share-latch the sibling second node, unlatch the first node that was copied, and copy the sibling second node preferably into persistent storage. The computer program product further has programming instructions that when executed cause a processor to: determine if there is a sibling third node linked to the right of the sibling second node, and in response to a sibling third node linked to the right of the sibling second node: (a) follow a link between the sibling second node and the sibling third node, (b) share-latch the sibling third node, (c) unlatch the sibling second node, and (d) copy the sibling third node into persistent storage. In an aspect, the computer program product has programming instructions that when executed cause a processor to copy only leaf nodes, and in an embodiment only leaf nodes containing two or more records, into persistent storage.

Also disclosed is a computer program product that has programming instructions that when executed cause a processor in one or more aspects to restore a data tree structure by: identifying the most recent complete checkpoint file; reading the nodes in the most recent complete checkpoint file from storage; and copying the nodes read from the most recent complete checkpoint file from storage concurrently and directly into memory without buffering. The computer program product in an embodiment further has programming instructions that when executed cause a processor to restore the data tree structure by updating the checkpoint nodes read from the most recent complete checkpoint file to include data from records written and stored in a record log.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of computer systems, data organizational and management structures, data organizational trees, B-trees, the processing, storing, organizing, managing, searching for, retrieving, inserting, deleting, and restoring of data records in data structures will be better understood when read in conjunction with the figures provided. Embodiments are provided in the figures for the purpose of illustrating aspects, features, and/or various embodiments of the computer systems, data organizational and management structures, data organizational trees, B-trees, the processing, storing, organizing, managing, searching for, retrieving, inserting, deleting, and restoring of data records in data structures, but the claims should not be limited to the precise arrangement, structures, features, aspects, assemblies, subassemblies, systems, circuitry, embodiments, or devices shown, and the arrangements, structures, assemblies, subassemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1:
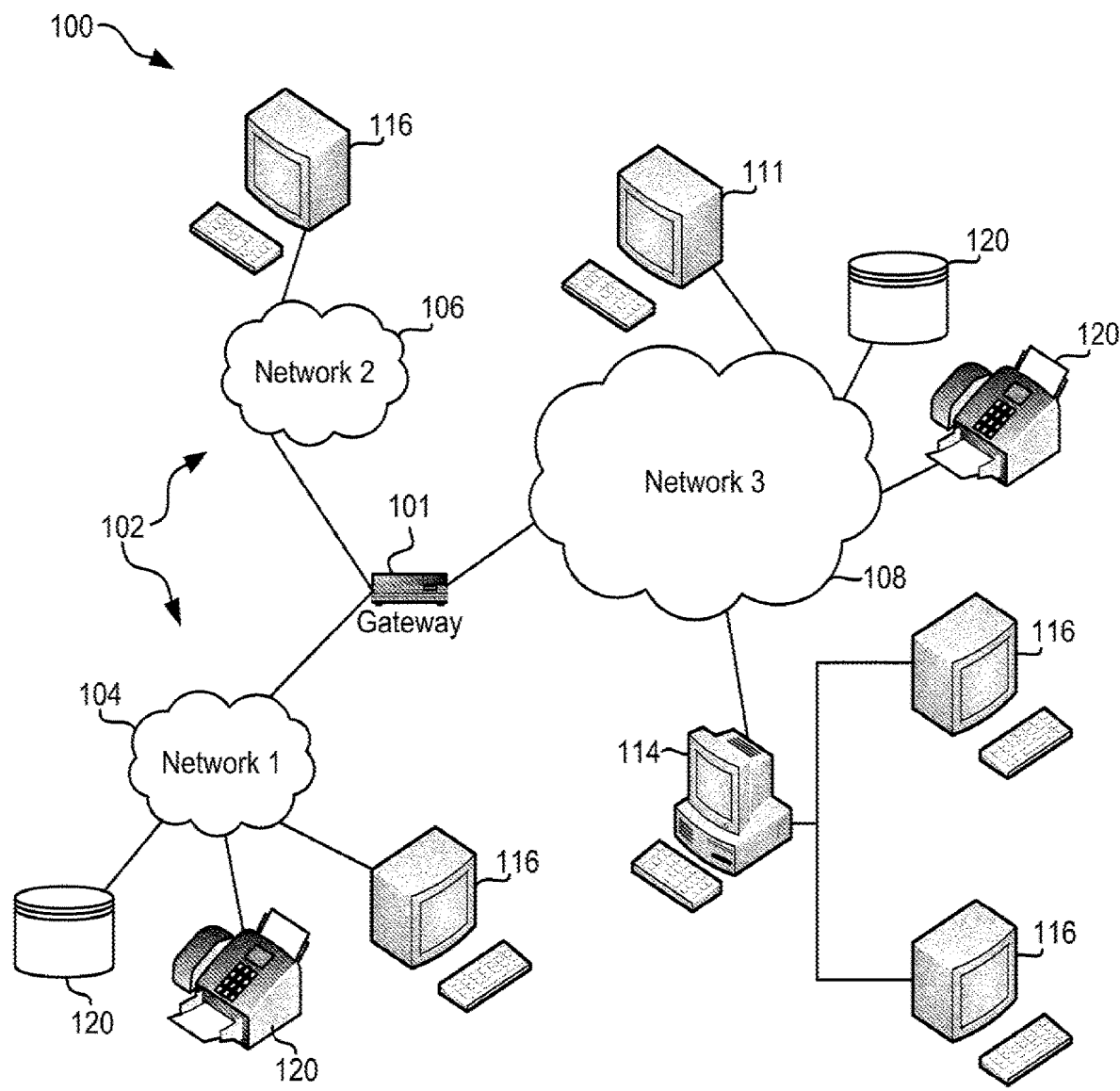
FIG. 1 depicts one example of a computing environment, according to embodiments of the present disclosure.

The following description is made for illustrating the general principles of the invention and is not meant to limit the inventive concepts claimed herein. In the following detailed description, numerous details are set forth in order to provide an understanding of the computer systems, data organizational and management structures, data trees, B-trees, the processing, storing, organizing, managing, searching for, retrieving, inserting, deleting, and restoring of data records in data structures, however, it will be understood by those skilled in the art that different and numerous embodiments of the computer system, data organizational and management structures, data organization trees, B-trees, the processing, storing, organizing, managing, searching for, retrieving, inserting, deleting, and restoring data records in data structures may be practiced without those specific details, and the claims and disclosure should not be limited to the embodiments, assemblies, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "content" or "data" means any computer-readable data including, but not limited to, digital photographs, digitized analog photos, music files, video clips, text documents, interactive programs, web pages, word processing documents, computer assisted design files, blueprints, flowcharts, invoices, database reports, database records, video game assets, sound samples, transaction log files, electronic documents, files which simply name other objects, and the like. The content may be organized and stored in the form of objects, files, blocks, or any other suitable format in one or more data storage systems, and can include files, directories, file system volumes, data blocks, extents, or any other hierarchies or organizations of data blocks. As used herein, a "data set" can refer to (1) any file that is currently addressable by a file system or that was previously addressable by the file system (e.g., an archive file) and/or (2) a subset of such a file (e.g., a data block). Data may include structured data (e.g., database files), unstructured data (e.g., documents), and/or semi-structured data. Specifically, a data set can be a file, directory, share, volume, region within a volume, or an embedded object. Data sets can be complex, containing other embedded objects. For example, a file can be a container containing other files, or a volume can have a file system on top of it which in turn contains files. The system is capable of recognizing complex objects and tracking changes at finer embedded object granularity.

A "container" may be a data set which may have other embedded objects, such as a file, directory, file system, or volume.

As used herein, the term "metadata" refers to any descriptive or identifying information in computer-processable form that is associated with particular content or a data set. Generally speaking, content will have metadata that is relevant to a number of characteristics of the content and the overall content collection (e.g., a file), including, but not limited to, the content's technical aspects (format, bytes used, date of creation), the workflow in which the content participates (creator, owner, publisher, date of publication, copyright information, etc.) and the subject matter of the content (the nature of the sound of an audio file, be it music or a sound-effect, the subject of a photograph or video clip, the abstract of a lengthy text document, excerpted particulars of invoices or other data-interchange format files). For example, metadata items may include but are not limited to one or more of the following: the content owner (e.g., the client or user that generates the content), the last modified time (e.g., the time of the most recent modification of a data set), a data set name (e.g., a file name), a data set size (e.g., a number of bytes of data set), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data block), location/network (e.g., a current, past or future location of the data set and network pathways to/from the data block), geographic location (e.g., GPS coordinates), frequency of change (e.g., a period in which the data set is modified), business unit (e.g., a group or department that generates, manages or is otherwise associated with the set), aging information (e.g., a schedule, such as a time period, in which the data set is migrated to secondary or long term storage), boot sectors, partition layouts, file location within a file folder directory structure, user permissions, owners, groups, access control lists [ACLS]), system metadata (e.g., registry information), combinations of the same or the other similar information related to the data set.

The term "metadata tag" or "tag" refers to any descriptive or identifying information in computer-processable form that is associated with particular metadata, and that is indicative of the actual information of the content included in various data storage systems and with which the metadata is associated.

The following discussion omits or only briefly describes conventional features of data storage systems and information processing systems, including data organizational and management structures, data trees, B-trees, the processing, storing, organizing, managing, searching for, retrieving, inserting, deleting, and restoring of data records in data structures, which are apparent to those skilled in the art. It is assumed that those skilled in the art are familiar with the general architecture of data storage systems, operations of data storage systems for data storage and/or operations on stored data, data organizational and management structures, data trees, B-trees, the processing, storing, organizing, managing, searching for, retrieving, inserting, deleting, and restoring of data records in data organization structures. It may be noted that a numbered element is numbered according to the figure in which the element is introduced, and is typically referred to by that number throughout succeeding figures.

A system and method for storing, organizing, sorting, managing, and processing collections of data are disclosed. In one or more embodiments, a method and system for copying each record containing node (also referred to as a leaf or leaf node) of a data tree to storage, preferably non-volatile or persistent storage, and in an aspect reconstructing the tree by reading the leaves back from storage into memory, e.g., main memory, is disclosed. Non-leaf nodes (also referred to as indices) in one or more embodiments are not copied as they contain only references to other nodes and can be reconstructed. In an embodiment, the non-leaf nodes or indices of the tree are copied to avoid time reconstructing them. Where the non-leaf nodes or indices are copied, the node references or pointers can remain the same when restoring the tree or they can be modified when the tree is reconstructed. By copying a leaf node potentially containing several records, the number of operations can be reduced compared to solutions that perform a copy operation for each record. In addition, the leaf nodes or leaves do not have to be reconstructed as they are simply restored from the copy previously saved in storage. Advantageously, all the leaf nodes can be copied or restored concurrently, and do not have to be copied or restored serially. Further advantages include in one or more embodiments the systems, methods and techniques store nodes of the tree (containing data) in a checkpoint that is separate from other data and information that is written to and saved in a record log. The data is saved in different formats, and the checkpoint data preferably does not require additional data to be processed at reconstruction and which makes discard or overwrite of old copies more easily handled.

Turning to the environments in which the system, methods and techniques have potential application. FIG. 1 illustrates an architecture 100, in accordance with an embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, smartphone, or any other type of logic device. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
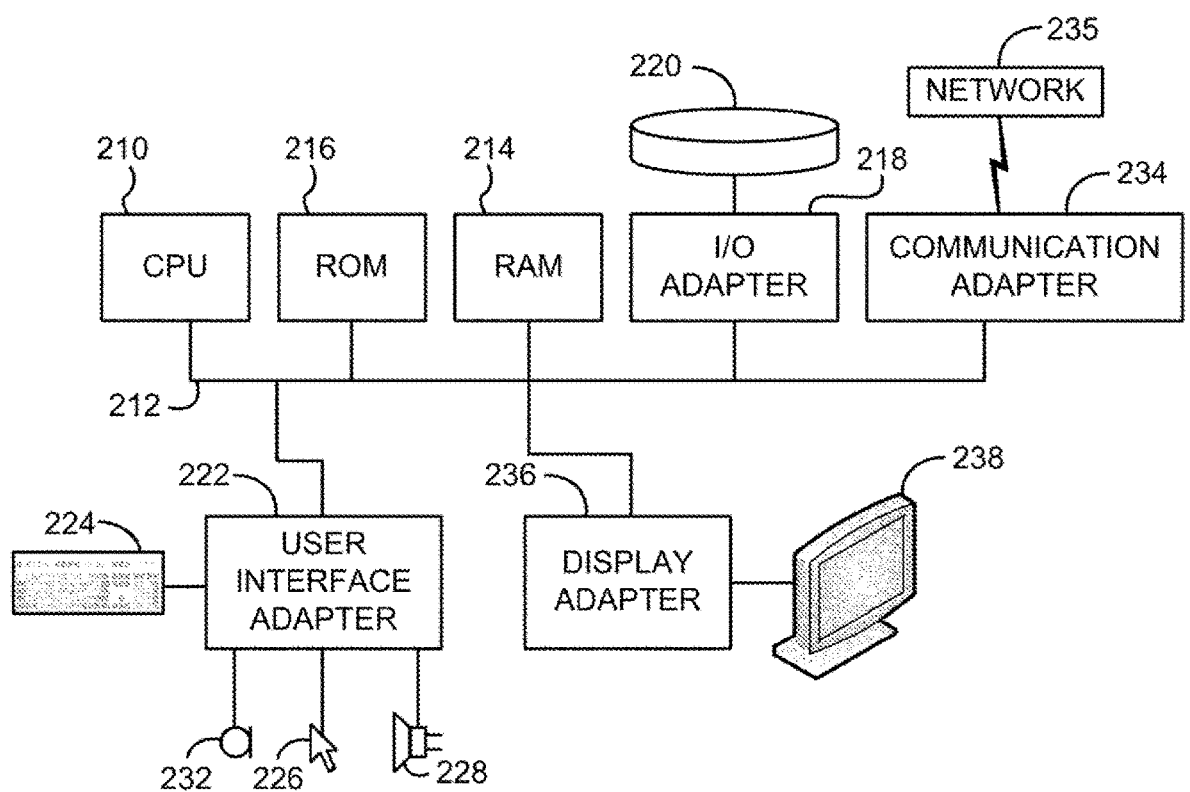
FIG. 2 is a functional block diagram illustrating a computer system, according to embodiments of the present disclosure.

FIG. 2 shows a representative hardware environment associated with a user device 116 and/or server 114 of FIG. 1, in accordance with one embodiment. Such figure illustrates an example hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), MAC OS, UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
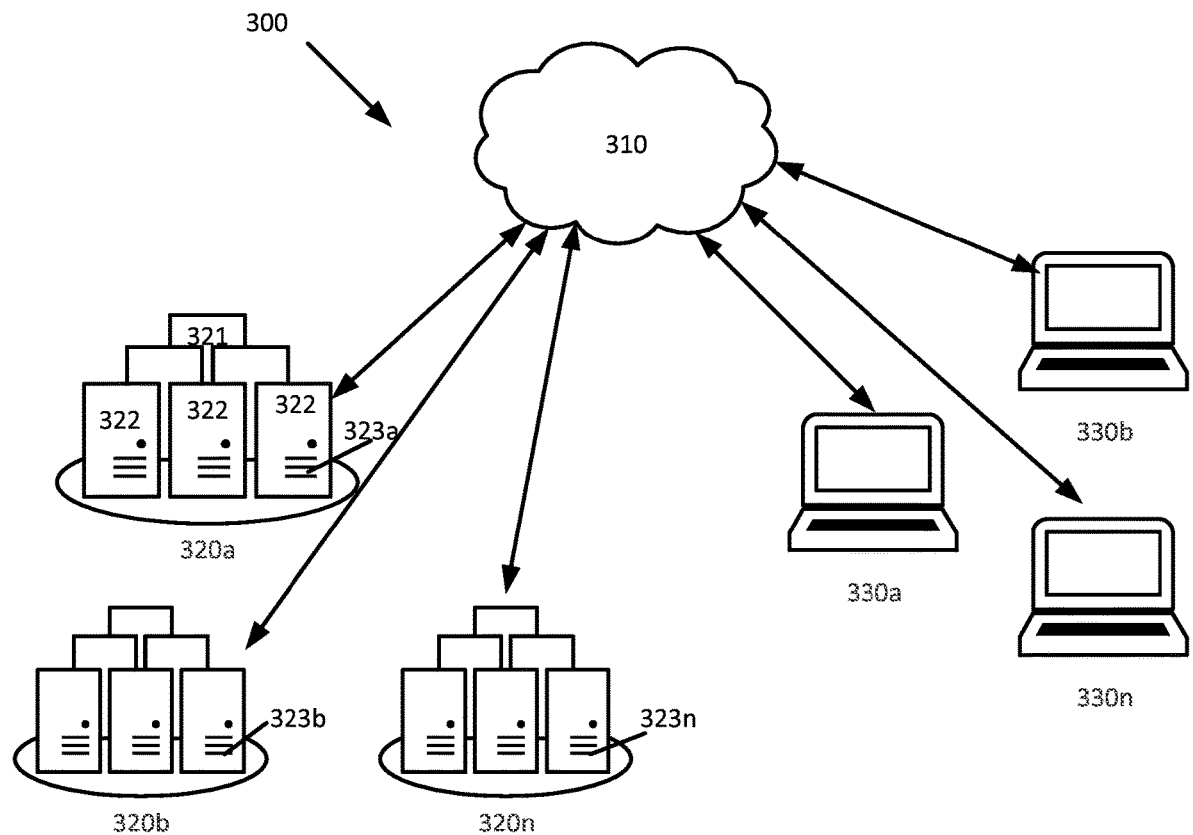
FIG. 3 depicts an example block diagram of an information management system, according to embodiments of the present disclosure.

Referring now to FIG. 3, there is illustrated an example block diagram of an information management system 300 that includes a set of networked data storage systems 320a, 320b . . . 320n and client devices 330a, 330b . . . 330n in communication via a data network 310 and in accordance with implementations of this disclosure. It can be appreciated that the implementations disclosed herein are not limited by the number of storage devices or data storage systems attached to data network 310. It can be further appreciated that storage devices or data storage systems attached to data network 310 are not limited by communication protocols, storage environment, physical location, etc.

In one embodiment, each data storage system 320a, 320b . . . 320n may include a storage subsystem 321 and storage devices 322. The storage subsystem 321 may comprise a storage server or an enterprise storage server, such as the IBMS Enterprise Storage Server®. (IBM and Enterprise Storage Server are registered trademarks of IBM). The storage devices 322 may comprise storage systems known in the art, such as a Direct Access Storage Device (DASD), Just a Bunch of Disks (JBOD), a Redundant Array of Independent Disks (RAID), a virtualization device, tape storage, optical disk storage, or any other storage system known in the art. The storage devices 322 may comprise content organized as object storage, file storage, and/or block storage. In certain embodiments, multiple storage subsystems may be implemented in one storage subsystem 321 and storage devices 322, or one storage subsystem may be implemented with one or more storage subsystems having attached storage devices.

In certain embodiments, client devices 330a, 330b . . . 330n may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system. The client devices 330a, 330b . . . 330n can have at least one operating system (e.g., Microsoft Windows, Mac OS X, iOS, IBM z/OS, Linux, other Unix-based operating systems, etc.) installed thereon, which may support or host one or more file systems and other applications.

The data storage systems 320a, 320b . . . 320n and client devices 330a, 330b . . . 330n communicate according to well-known protocols, such as the Network File System (NFS) or the Common Internet File System (CIFS) protocols, to make content stored on data storage systems 320a, 320b . . . 320n appear to users and/or application programs as though the content were stored locally on the client systems 330a, 330b . . . 330n. In a typical mode of operation, the client devices 330a, 330b . . . 330n transmit one or more input/output commands, such as an NFS or CIFS request, over the computer network 310 to the data storage systems 320a, 320b . . . 320n, which in turn issues an NFS or CIFS response containing the requested content over the network 310 to the respective client devices 330a, 330b . . . 330n.

The client devices 330a, 330b . . . 330n may execute (internally and/or externally) one or more applications, which generate and manipulate the content on the one or more data storage systems 320a, 320b . . . 320n. The applications generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on. The applications may also have the ability to access (e.g., read and write to) data storage systems 320a, 320b . . . 320n using a network file system protocol such as NFS or CIFS.

As shown, the data storage systems 320a, 320b . . . 320n, the client devices 330a, 330b . . . 330n, and other components in the information management system 300 can be connected to one another via a communication network 310. The communication network 310 can include one or more networks or other connection types including any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication network 310 in some cases may also include application programming interfaces (APIs) including, e.g., cloud service provider APIs, virtual machine management APIs, and hosted service provider APIs.

Figure 4:
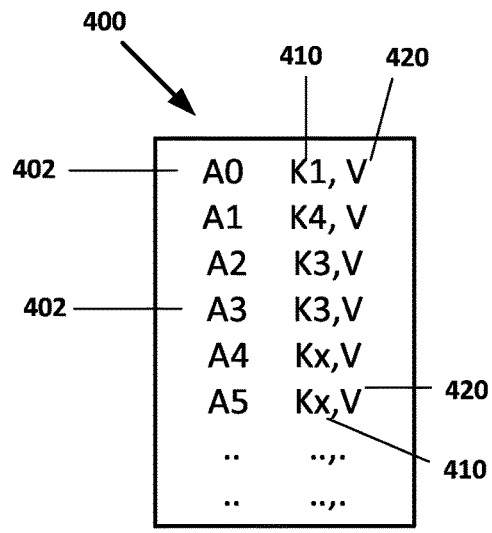
FIG. 4 is an example depiction of a record log for data stored in a data storage system.

Each data record in a large collection of data can be identified by a key. A key is a unique identifier for a record, and in an embodiment is user-specified. A key is provided when a record is written (stored) and can be used to retrieve that data. Records in one or more embodiments are stored persistently in a record log where the record is mapped or associated with the key. A number of different types of structures are used for storing, sorting, organizing, and managing data in data storage and computerized systems. Tree structures are one technique used to optimize the organization of, and ability to locate a particular item stored in, a large collection of data and information. Keys can be stored and sorted in a tree, preferably a balanced tree to provide accesses to the keys in logarithmic time. All records written to the tree in one or more aspects are logged in the record log. In an embodiment, each record's log address is stored in an in-memory index sorted by the key. The record log in one or more embodiments is updated continuously and in an aspect saved persistently in storage. A tree in an embodiment has one record log, and in an aspect all tree record writes are ordered chronologically. One example of a record log associating a key with a record is shown in FIG. 4. Each entry 402 in Record Log 400 has a unique key 410 associated with a value (V) 420. In FIG. 4, the Record Log 400 is a table structure, A0-A5 are entries 402, K1-Kx are keys 410, and V are values or records 420 associated with the unique key 410. The records or values 420 can be user data itself or in an embodiment a log or memory address where the user data is stored.

Figure 6:
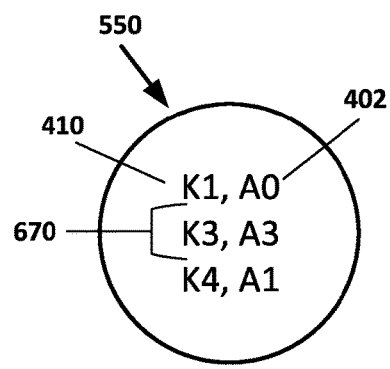
FIG. 6 is an example leaf node for a data tree structure.
Figure 5:
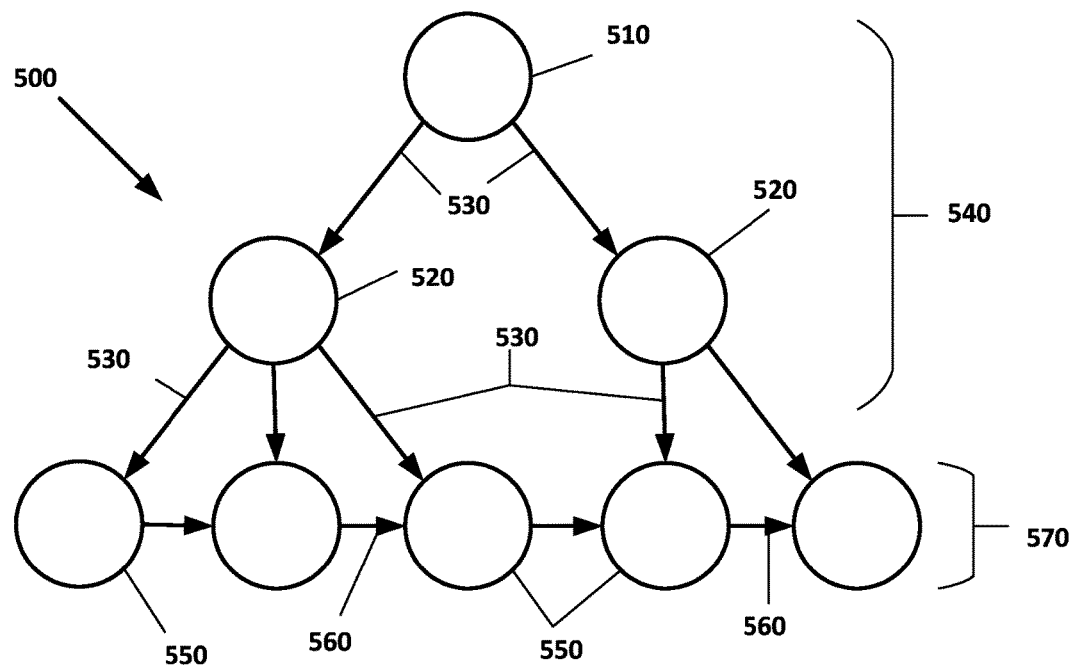
FIG. 5 is an example block diagram of a data tree structure.

There are a number of different tree structures for organizing data and its index. A B-tree is one example of a tree for organizing data stored on a data storage system. A B-tree is a self-balancing tree data structure that maintains sorted data and allows searches, sequential access, insertions, and deletions in logarithmic time. A B-Tree has a root node, internal nodes, and leaf nodes. The root can be either a leaf node or an internal node. Nodes in a B-tree can have more than two children. The order or branching factor "d" of a B-Tree measures the capacity (i.e., the number of children nodes) of internal nodes in the tree. FIG. 5 illustrates example B-tree 500 having a root node 510, internal nodes 520, and leaves 550. The nodes in tree 500 are illustrated as connected by pointers or references 530 and links 560. The lowest level 570 of the tree are leaf nodes 550 that are record containing nodes, and the upper levels or top portion 540 of the tree 500 comprising the internal nodes 520 and the root 510 do not contain any of the records and are an index to the leaf nodes 550. FIG. 6 shows an illustration of the data and entries contained in leaf nodes 550 for the Record Log 400 of FIG. 4. In this regard, each leaf node 550 in FIG. 6 contains multiple entries 670 where each entry 670 is sorted by key 410 and is associated with an entry 402 in the Record Log 400 saved in memory, preferably saved persistently in non-volatile storage. As will be explained, each leaf node in one or more embodiments is stored in a checkpoint file preferably in persistent storage.

Figure 7:
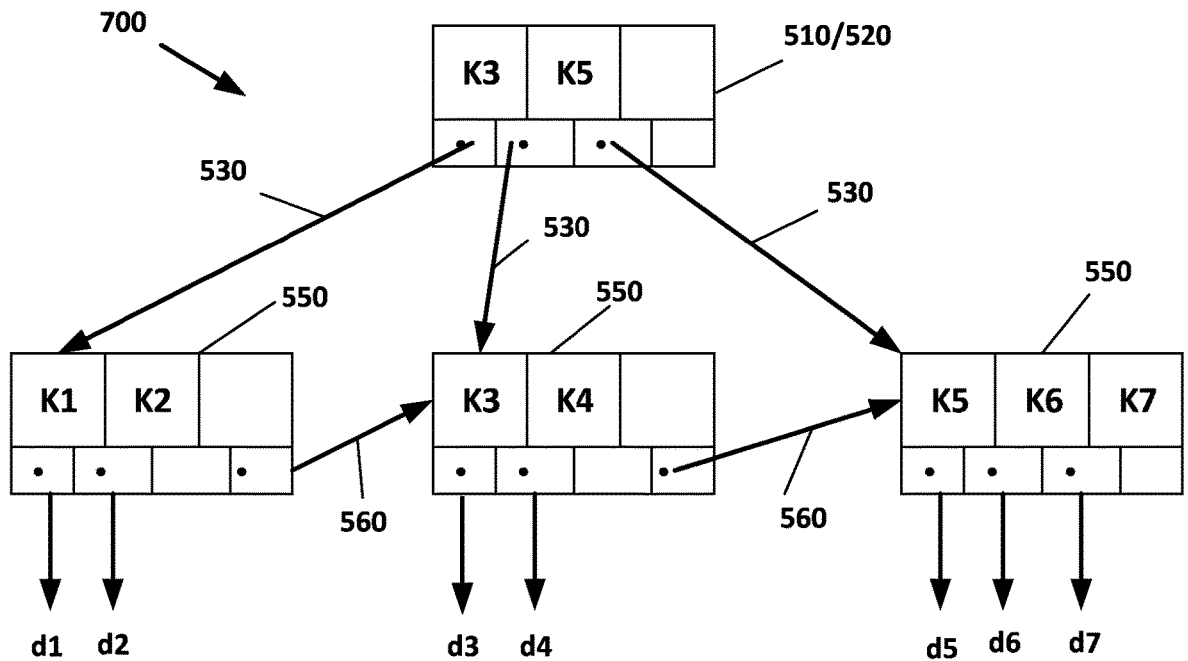
FIG. 7 is an example B+-tree for organizing and managing a data structure.

FIG. 7 shows a simple B-Tree that will be used to illustrate how a B-Tree would operate to search for and locate data. In practice, with large collections of data, B-Tree 700 would contain many more leaf nodes 550 and internal nodes 520. B-Tree 700 has a branching factor or order of 4, a root node 510, three pointers 530 pointing to three leaf nodes 550, where each leaf node 550 is a record containing node. B-Tree 700 has two links 560 between the three leaves 550 and links the keys K1-K7 to data values d1-d7. In an example where K4 is to be located, the root node 510 would direct the search to the middle leaf node 550 since K4 is greater than K3, but less than K5. Once directed to the middle leaf node 550, the entries in the middle leaf node are searched, usually sequentially starting from the left with K3 until K4 is located. K4 would refer to an entry 402 in a log, e.g., Record Log 400, saved to memory, where the log entry would contain the requested data and/or an address in memory where the data is stored.

It is useful to store a sorted tree and restore it for functions such as data snapshot, error recovery, and system start. The format in which the tree is stored can influence the amount of time it takes to restore the tree. One manner of restoring and reconstructing a tree is to create a checkpoint file, where each leaf node (i.e., each record-containing node) is copied to storage, preferably persistent, non-volatile storage, and when restoring or reconstructing the tree read the leaves (leaf nodes) back from storage into memory. A checkpoint file is a file containing a data tree's nodes. Non-leaf nodes, such as for example internal nodes and the root node, can also be copied in an embodiment to a checkpoint file to avoid time reconstructing them, but in one or more embodiments, the non-leaf nodes are not copied as they contain only references (pointers) to other nodes and are not necessary to reconstruct the tree. By copying a node to a checkpoint file, potentially containing several records, the number of operations to copy each record can be reduced. Also, by copying the nodes they do not need to be reconstructed during restoration, and all the leaf nodes together can be read and restored concurrently, rather than one at a time in a serial manner.

In an embodiment a tree structure is employed, e.g., a B-Tree, preferably a tree structure where the leaf nodes are linked, and in an aspect each leaf node has a reference to its right sibling. The leaf nodes or leaves are traversed by starting at the left and moving to the right, copying each leaf node to a checkpoint file preferably configured as a file-like object, e.g., a table. A direct copy operation preferably is used, and in one or more embodiments no buffering is required. In one or more embodiments where non-leaf nodes, e.g., the internal nodes, are copied, the tree would include links between the non-leaf nodes, i.e., the non-leaf nodes would reference the sibling non-leaf node to its right, and references/pointers to other node levels, and copying would start at the left non-leaf node and traverse from left to right copying each non-leaf node into a file-like object, e.g., a table. Copying of non-leaf nodes in one or more embodiments would include copying the root node. A direct copy operation preferably is used on the non-leaf nodes, and in one or more embodiments no buffering is required.

In one or more embodiments, each node is copied while it is share-latched. A share-latch permits a node to be read, but not modified concurrently. After a node has been copied its right sibling reference (the link between nodes) would be followed to the sibling node to the right, that right sibling node would be share-latched, the node that was just copied is unlatched, and the right sibling node that is share-latched would be copied. If a node's right sibling reference is invalid, meaning it has no sibling node to its right, the share-latch for the node that was copied is released and the copying for that level of nodes is complete.

A file containing a tree's nodes is called a checkpoint (checkpoint file). In an aspect, each node is copied node-by-node to create a checkpoint, and in one or more embodiments, only each leaf node is copied to create a checkpoint. Creating a checkpoint does not happen instantly so in one or more aspects, a tree may have two (or more) checkpoints: a current in-progress checkpoint that may be incomplete and a previous complete checkpoint. A tree could have zero or more checkpoint files, one checkpoint file for each checkpoint, and in a preferred embodiment a current checkpoint file and a previous (complete) checkpoint file.

A checkpoint file in one or more embodiments has a metadata file associated with the checkpoint file, referred to herein as a checkpoint metadata file. A checkpoint metadata file identifies the tree's current checkpoint file and the tree's previous (complete) checkpoint file. A checkpoint metadata file in one or more embodiments identifies the most recent complete checkpoint. A tree's checkpoint metadata file in one or more aspects is atomically created or overwritten after a checkpoint completes. The checkpoint metadata file in one or more embodiments includes other checkpoint metadata, for example, a count of the nodes the checkpoint contains. The checkpoint metadata file or a header at the top of a checkpoint file in an aspect contains how many nodes a checkpoint contains. Other ways of determining the most recent complete checkpoint file, for example a time stamp, can be utilized.

After a checkpoint file is complete it can start immediately saving nodes for the "current" or next checkpoint. In one or more embodiments, saving nodes for the next checkpoint can start after a period of time, e.g., after a number of cycles, records saved, nodes saved, or number of a type of operations, and/or upon a triggering event, e.g., a type of operation. In an embodiment, the next checkpoint can start after a number of nodes (and/or records) have been updated (accessed, written, added, deleted) after the most recent complete checkpoint.

Figure 8:
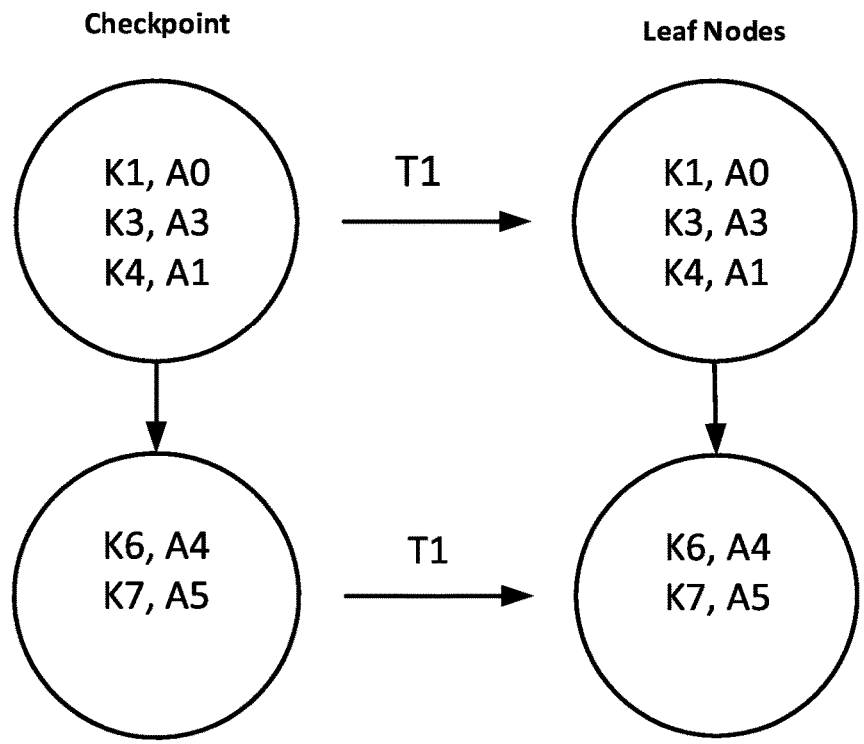
FIG. 8 is an example block diagram illustrating a checkpoint being copied to restore the leaf nodes of a data tree.

A tree may need to be restored for numerous reasons. A checkpoint is used to facilitate restoring the tree. A tree is restored preferably from its most recent checkpoint. To restore the leaf nodes, and/or tree, a tree's checkpoint metadata file is read in an embodiment to determine in an aspect the checkpoint file to read and how big the tree is, e.g., how many nodes to read. Sufficient memory and input/output resources are allocated to read the checkpoint's nodes from storage, e.g., persistent storage, into memory, effectively reconstructing at least the leaf nodes. Copying of the nodes from the checkpoint file in one or more embodiments is direct with no buffering required, and in an aspect all the nodes can be copied concurrently (e.g., serial copying is not required). In an embodiment, all the leaf nodes in a checkpoint file residing in persistent memory is copied directly to memory. FIG. 8 illustrates a block diagram of a checkpoint being read/copied into memory effectively reconstructing and/or restoring at least the leaf nodes. As shown in FIG. 8, the leaf nodes saved in storage are copied concurrently together (at T1) and each leaf node contains several entries/keys. In an embodiment only leaf nodes are copied to restore the tree, and, in other embodiments, leaf and non-leaf nodes are copied to restore the tree. In an embodiment where non-leaf nodes are restored from storage, the non-leaf nodes are processed and copied similar to the leaf nodes.

As a number of operations may have been processed since the most recent complete checkpoint, restoring and reconstructing the leaf nodes, and the tree, in one or more embodiments includes applying to the leaf nodes and/or the tree after it is reconstructed from the most recent checkpoint, the tree record writes and changes that are logged from the time of the most recent complete checkpoints' beginning to the log's end. In this regard, a system can continue to write records after a checkpoint is completed, and those record writes should be logged for example in the record log, e.g., record log 400. The manner in which those additional record writes (and deletions) are collected and applied to update the checkpoint data can vary. In an embodiment, a tree's record log, e.g., Record Log 400, could be used to update the nodes copied from the checkpoint file. For example, the tree's record log could be used to apply updates to the nodes copied into memory to restore the data tree. In another embodiment, a tree's record log could be allocated or subdivided based upon each checkpoint with the record log divided into parts or pieces associated or allocated with each checkpoint. In this regard, one part of the tree's record log records writes from the start of a previous first checkpoint until the next second checkpoint is started and another part of the tree's record log records writes from the start of that next second checkpoint until a third checkpoint. In an aspect, like the checkpoint files, the record log entries or the part of the tree's record log could be deleted with their corresponding checkpoints. For example, when a second current part of the tree's record log becomes a complete record log, and a new third current record log is established, the previous first record log and its previous first checkpoint file can be deleted. In this regard, the part of the record tree log that recorded the updates to the data records and nodes could be used to update the nodes restored to memory from persistent storage.

In yet another embodiment, the system can have a checkpoint record log where all record writes (modifications, overwrites, and deletions) to nodes that have been copied to a checkpoint file since the start of a checkpoint file are recorded and stored in the checkpoint record log. In this regard, the checkpoint record log records all record writes, updates, and deletions to the instances of the nodes contained in the checkpoint file since the start of the checkpoint until the checkpoint file is complete and/or more preferably until the start of the next checkpoint, and then the checkpoint record log is written and updated by applying records written and updated from the start of the second checkpoint. The method, system and techniques in one or more embodiments applies the updates recorded in the tree record log, the appropriate part of the tree record log, or the checkpoint record log since the completion of the most recent complete checkpoint. This updating in an embodiment can be done by applying the updates in the tree's record log, the appropriate part of the tree's record log, and/or the checkpoint's record log sequentially and in the order they were recorded to the nodes copied from the checkpoint file.

Pointers to the nodes are set if necessary. In this regard, after the nodes are updated, in one or more embodiments, the indices and the root of the tree are constructed so the data tree can be efficiently used to efficiently handle record accesses. In one or more aspects the pointers or references to other nodes can remain the same as the tree that was saved in the checkpoint, or in an embodiment, the pointers can be modified at reconstruction of the tree. To summarize, an example tree can have in an embodiment the following files associated with the tree: a checkpoint metadata file; checkpoint file 1 (previous, complete checkpoint file); checkpoint file 2 (current checkpoint file); checkpoint 1 record log; and checkpoint 2 record log. It can be appreciated that the checkpoint 1 record log and checkpoint 2 record log could be one record log where different entries are associated with the different checkpoints.

In an embodiment, metadata corresponding to contents of the storage systems 320a, 320b . . . 320n is collected and stored. The metadata can be stored, organized, protected, managed, manipulated, moved, analyzed, and/or processed. Other types of information that generally provides insights into the contents of the storage systems 320a, 320b . . . 320n can also be stored.

Figure 9:
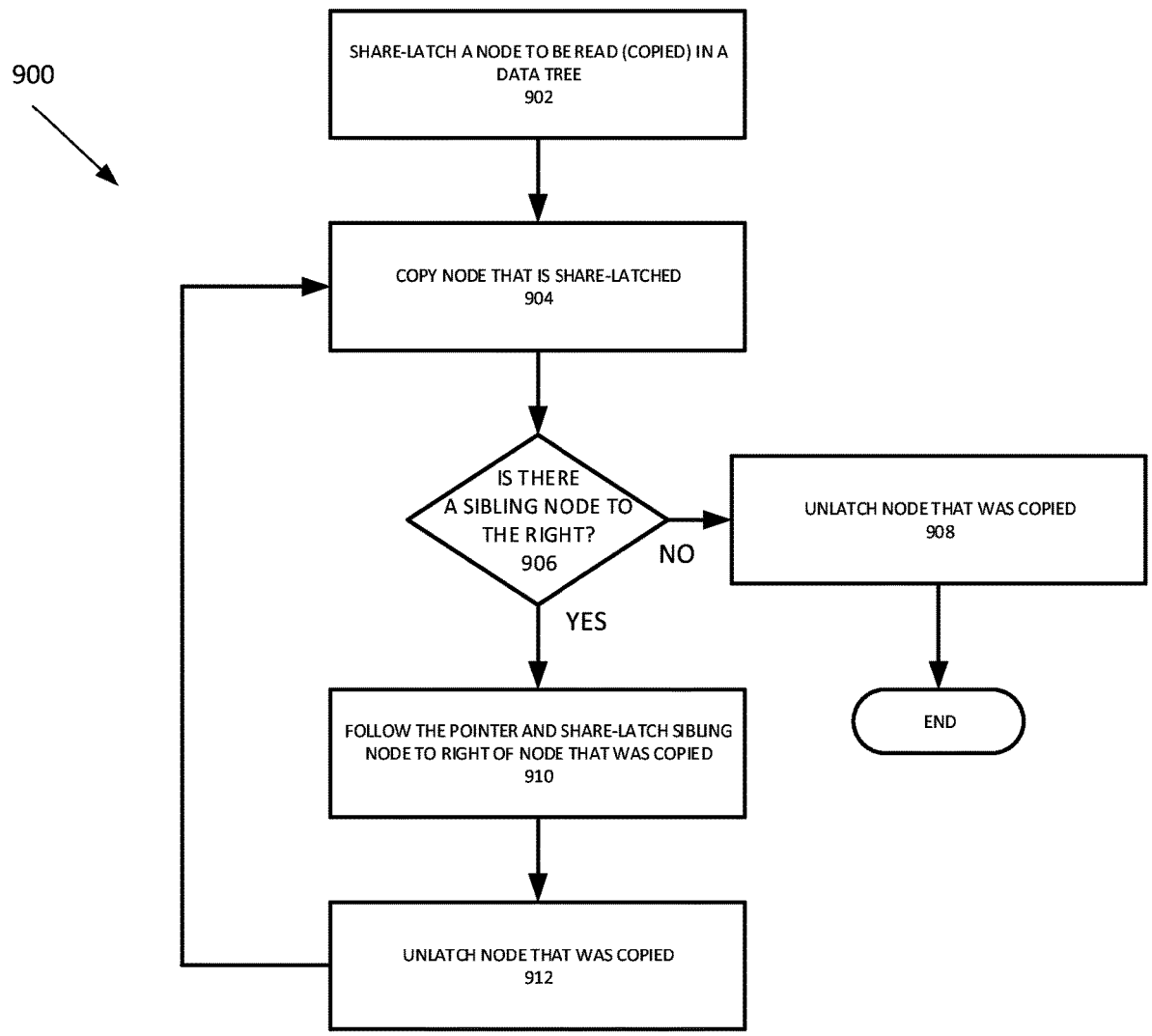
FIG. 9 is an exemplary flowchart illustrating and describing a method of storing data in a tree structure according to embodiments of the present disclosure.

Referring now to FIG. 9, an exemplary flowchart in accordance with various embodiments illustrating and describing a method of copying nodes, preferably nodes containing records, e.g., leaf nodes, is illustrated. While the method 900 shown in FIG. 9 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9 but the process may be integrated and/or one or more steps may be performed together, simultaneously, or the steps may be performed in the order disclosed or in an alternate order.

At step 902, a node to be copied, e.g., read and stored in storage, preferably into persistent storage, is share-latched. A share-latch permits a node to be read, but not modified (written and/or overwritten). In this regard, a node typically contains more than one entry, e.g., a plurality of entries. The node in a preferred embodiment is a leaf node that in one or more aspects contains one or more records, but in embodiments can be internal nodes or a root node. The node to be copied and the system and process can start at the left most leaf node or internal node. That is, in an embodiment, the system and method start at the left most node, referred to in this example as the first node. The node that is share-latched is copied at 904. The node copied at 904 is preferably copied and stored in persistent or non-volatile memory (and in an aspect later restored to main memory). In this regard, as the node preferably contains more than one entry, copying the node copies more than one entry. In an embodiment, leaf nodes are copied at 904 containing one or more records, preferably a plurality of records, and in an aspect more than one record is copied when a leaf node is copied.

At 906 it is determined whether or not there is a sibling node (second node) to the right of the (first) node. In an embodiment, a sibling node is a node of the same level that is referenced by another node of the same level. If at 906 there is not a sibling node, e.g., a second node to the right (906: No), then the process proceeds to 908 where the node that was just copied (e.g., the first node) is unlatched. If the system, method and techniques 900 copies only the leaf nodes, the method 900 would copy only one level of nodes and would be complete and end. However, if the method includes processing of non-leaf nodes and/or internal nodes, then the process in an embodiment would continue to the next level of nodes, e.g., the level above the leaf nodes, and the process would start at 902 where the first non-leaf node, preferably the most left non-leaf mode would be share-latched. In another embodiment, if the method includes processing of non-leaf nodes and/or internal nodes, then the process starts at the root node where the root node would be copied, and then progresses to the next lower level of internal nodes where the internal nodes would be copied, and continues processing the internal nodes until all the internal nodes are copied, and then the leaf nodes would be copied.

If one the other hand, the node that was just copied does have a sibling node to its right, e.g., the node that was just copied references a sibling node to the right (906: Yes), then the process proceeds to 910. At 910 the reference or link between the node that was copied and its sibling node to the right is followed and the right sibling (second) node is share-latched. The process 900 continues to 912 where the node that was copied is unlatched. In this regard the node that was copied is unlatched so in an aspect it can be written to and modified after it has been copied. After 912, the method 900 continues to 904 where the node that is share-latched (which in this example should now be the sibling (second) node) is copied. The process then continues to 906 where it is determined whether or not there is a sibling node to the right. Depending upon the response to 906, the process will continue to 908 or 910. The process 900 will continue until all the nodes in a level, e.g., all the leaf nodes are copied. If internal or non-leaf nodes are to be copied as part of the checkpoint, then the process 900 continues to the next level of nodes and the process starts at 902. It will be appreciated, that in the embodiment where indices (internal nodes) are to be copied the process 900 can start at the root node and/or an internal node level and copy the root node and/or internal nodes by copying the nodes level by level. It will be appreciated that after all levels of the nodes (as per the system design) have been copied the checkpoint is complete. In an embodiment, the checkpoint is complete after all the leaf nodes have been copied. It will be further appreciated that while the nodes are being copied and the checkpoint is being completed, the system can continue to write records to the data tree and the records written will be stored in the tree's record log, and in one or more embodiments the records will additionally and/or alternatively be written to the checkpoint record log.

Figure 10:
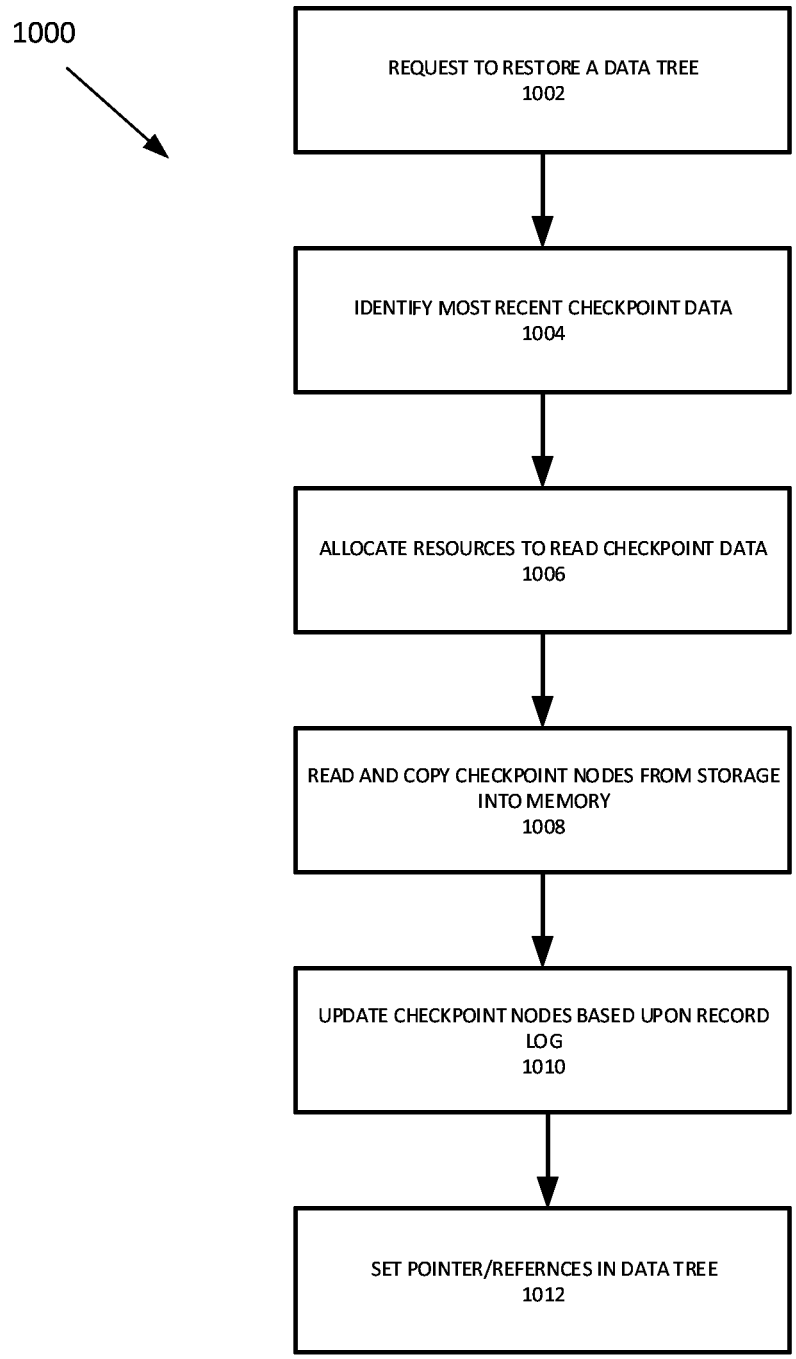
FIG. 10 is an exemplary flowchart illustrating and describing a method of restoring data in a tree structure according to embodiments of the present disclosure.

Referring now to FIG. 10, an exemplary flowchart in accordance with various embodiments illustrating and describing a method of restoring a data tree, e.g., restoring leaf nodes, by copying nodes, preferably nodes containing records, e.g., leaf nodes, from a checkpoint file in persistent storage to memory is illustrated. While the method 1000 shown in FIG. 10 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10 but the process may be integrated and/or one or more steps may be performed together, simultaneously, or the steps may be performed in the order disclosed or in an alternate order.

There could be any number of reasons to restore a data tree. In the method 1000 of restoring a data tree, at step 1002 a request to restore a data tree is received. At 1004, the most recent complete checkpoint file is identified. As discussed above, a checkpoint metadata file could identify the most recent complete checkpoint file, although other methods of identifying the checkpoint to use to restore the nodes of a data tree are contemplated. In addition, the number of nodes to be copied could be identified from the checkpoint metadata file. At 1006, resources to copy the nodes from persistent memory, e.g., storage, are allocated, and at 1008 checkpoint nodes are read from storage, e.g., persistent or non-volatile storage, to memory, e.g., main memory or local memory. The nodes may be directly copied with no buffering, and the nodes may be all copied together concurrently or in groups. In an aspect, the records or the nodes are not copied sequentially from the checkpoint file/data. In an embodiment, multiple records are copied with the nodes. In one or more embodiments, only leaf nodes are copied from storage to memory, although depending upon the design of the system and the nodes saved in the checkpoint, non-leaf nodes can be copied from storage to memory.

In a further aspect, at 1010 the nodes copied to memory, e.g., main memory or local memory, are updated to include record data since the most recent complete checkpoint was finished. While the nodes of a tree are being copied during a checkpoint and before copying the nodes for the next checkpoint file are started, the system can continue to process records and data that will alter and modify the data tree. Those updates after the most recent complete checkpoint will need to be applied to the nodes copied from storage to memory as part of the data tree restoring process. In this regard, the tree record log can be used to update and copy nodes (and/or data in the nodes) to complete restoring the nodes of the data tree. In another embodiment, the checkpoint record log can be used to obtain the updates to be applied to the nodes copied from the checkpoint file. In an aspect, at 1010 the nodes are copied to memory are updated using the updates from the checkpoint record log. In an alternative, the system and method of creating the checkpoint file can include recording in the checkpoint record log updates to the leaf node only after the leaf node has been copied as part of a checkpoint file.

In one or more embodiments, at 1012 the pointers or references between the nodes can be set. In this regard, where only the leaf nodes have been copied and restored, the data tree is created, and in particular the root node and indices (internal nodes) are created, so that records and nodes can be easily accessed in logarithmic time. In an embodiment, the pointers or references can be modified based upon the reconstruction of the data tree. In a further embodiment where the non-leaf nodes are copied and used to restore the tree, depending upon what nodes were saved in the checkpoint and the updates applied to the nodes after the checkpoint file restored the nodes, the pointers and references can be set based upon the old data tree or rebuilt and modified.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 9-10, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing data in a data storage system comprising:
   share-latching a first node of a data tree to be copied into persistent storage;
   copying the first node that is share-latched into persistent storage;
   determining if there is a sibling second node linked to the first node; and
   in response to the presence of a sibling second node linked to the first node, following a link between the first node that was copied and the sibling second node, share-latching the sibling second node, unlatching the first node that was copied, and copying the sibling second node into persistent storage.

2. The method of claim 1, further comprising determining if there is a sibling third node linked to the right of the sibling second node, and in response to a sibling third node linked to the sibling second node, following a link between the sibling second node and the sibling third node, share-latching the sibling third node, unlatching the sibling second node, and copying the sibling third node into persistent storage.

3. The method of claim 1, further comprising, in response to there being no sibling node linked to a node that was copied, unlatching the node that was copied.

4. The method of claim 3, wherein in response to there being no sibling node linked to a node that was copied, the method further comprises determining whether the method should proceed to copy an upper level of nodes into persistent storage.

5. The method of claim 4, wherein in response to determining that the method should proceed to copy an upper level of nodes into persistent storage, copying non-leaf nodes into persistent storage.

6. The method of claim 5, wherein pointers to nodes are copied into persistent storage.

7. The method of claim 1, wherein each node that is copied into persistent storage contains two or more records.

8. The method of claim 1, wherein only leaf nodes containing records are copied into persistent storage.

9. The method of claim 1, further comprising restoring a data tree structure by copying the nodes in persistent storage into memory.

10. The method of claim 9, wherein restoring the data tree structure comprises identifying a most recent complete checkpoint file.

11. The method of claim 10, wherein restoring the data tree structure further comprises reading the nodes in the most recent complete checkpoint file from persistent storage and copying the nodes read from the most recent complete checkpoint file into memory.

12. The method of claim 11, wherein restoring the data tree structure further comprises copying the nodes from the most recent complete checkpoint file in persistent storage concurrently into memory.

13. The method of claim 11, wherein restoring the data tree structure comprises updating the nodes copied from the most recent compete checkpoint file based upon data written since the most recent complete checkpoint file finished.

14. The method of claim 13, wherein restoring the data tree structure comprises updating the nodes read from the most recent complete checkpoint file to include data from records written and stored in a record log.

15. The method of claim 11, further comprising setting pointers for the nodes copied from persistent storage into memory and the updated nodes.

16. A computer program product, the computer program product embodied on one or more computer-readable media and comprising programming instructions that when executed cause a processor to:
   share-latch a first node of a data tree to be copied into persistent storage;
   copy the first node that is share-latched into persistent storage;
   determine if there is a sibling second node linked to the right of the first node; and
   in response to a sibling second node linked to the right of the first node, follow a link between the first node that was copied and the sibling second node, share-latch the sibling second node, unlatch the first node that was copied, and copy the sibling second node into persistent storage.

17. The computer program product of claim 16, wherein the computer program product further comprises programming instructions that when executed cause a processor to:

determine if there is a sibling third node linked to the right of the sibling second node, and in response to a sibling third node linked to the right of the sibling second node:

follow a link between the sibling second node and the sibling third node, share-latch the sibling third node, unlatch the sibling second node, and copy the sibling third node into persistent storage.

18. The computer program product of claim 17, wherein the computer program product further comprises programming instructions that when executed cause a processor to copy only nodes containing two or more records into persistent storage.

19. The computer program product of claim 18, wherein the computer program product further comprises programming instructions that when executed cause a processor to:

restore a data tree structure by:

identifying the most recent complete checkpoint file;

reading the nodes in the most recent complete checkpoint file from persistent storage; and copying the nodes read from the most recent complete checkpoint file from persistent storage concurrently and directly into memory without buffering.

20. The computer program product of claim 19, wherein the computer program product further comprises programming instructions that when executed cause a processor to: restore the data tree structure by updating the checkpoint nodes read from the most recent complete checkpoint file to include data from records written and stored in a record log.

* * * * *